United States Patent [19]

Dooley

[11] Patent Number: 5,077,376
[45] Date of Patent: Dec. 31, 1991

[54] LATENT HARDENERS FOR EPOXY RESIN COMPOSITIONS

[75] Inventor: John Dooley, Dublin, Ireland
[73] Assignee: Loctite (Ireland) Ltd., Dublin, Ireland
[21] Appl. No.: 526,370
[22] Filed: May 21, 1990
[30] Foreign Application Priority Data May 18, 1989 [IE] Ireland .................................. 1601/89

[51] Int. Cl.$^5$ .............................................. C08G 59/58
[52] U.S. Cl. ................................. 528/113; 252/182.28; 528/94; 528/103; 528/114; 528/339; 528/341
[58] Field of Search ................. 528/94, 103, 113, 114, 528/339, 341; 252/182.28

[56] References Cited

U.S. PATENT DOCUMENTS

| 3,756,984 | 9/1973 | Klaren et al. | 528/113 X |
| 4,069,203 | 1/1978 | Carey et al. | 528/94 |
| 4,247,426 | 1/1981 | Hinze et al. | 528/113 X |
| 4,546,155 | 10/1985 | Hirose et al. | 528/113 X |

Primary Examiner—Earl Nielsen
Attorney, Agent, or Firm—Edward K. Welch, II; Eugene F. Miller

[57] ABSTRACT

A latent hardener material for epoxy resins comprising a combination of

Hardener (A) which is a reaction product of phthalic anhydride and diethylenetriamine, and Hardener (B) which is a reaction product of a polyfunctional epoxy compound, an imidazole compound and a carboxylic acid anhydride.

A combination of latent hardeners (A) and (B) can achieve cure of an epoxy resin composition in 15 minutes at 76° C. A one part epoxy resin composition comprising an epoxy resin in admixture with a combination of hardeners (A) and (B) has a good shelf life.

8 Claims, No Drawings

LATENT HARDENERS FOR EPOXY RESIN COMPOSITIONS

BACKGROUND OF THE INVENTION

1. Field of the Invention

This invention relates to latent hardeners for epoxy resin compositions. In particular it relates to a synergistic combination of two classes of latent hardener. The invention is particularly suited for industrial use, especially in the electronics industry, for example in the manufacture of printed circuit boards and other electronic assemblies.

An uncured epoxy resin to which a latent hardener has been added can be stored in a stable condition at ambient temperature. When the temperature is increased the hardener is activated to cure the resin. A one-part epoxy resin composition of this kind is advantageous but there is a need for such a composition which combines good shelf life with a short curing time at relatively low temperatures.

2. Description of the Related Art

British Patent Specification No. 1,121,196 of Ciba Limited describes a latent hardener for epoxy resins comprising a reaction product of phthalic anhydride and diethylenetriamine. However this hardener requires an elevated temperature of at least 100° C. to cure epoxy resin compositions satisfactorily.

U.S. Pat. No. 4,546,155 Hirose et al assigned to Ajinomoto Co., Inc. describes a latent curing agent for epoxy resins which is an adduct obtained by reacting (i) a polyfunctional epoxy compound, (ii) a compound having at least one OH, $NH_2$, NH or SH group together with a tertiary amino group in the molecule and (iii) a carboxylic acid anhydride. The compound (b) may suitably be an imidazole compound such as 2-ethyl-4-methylimidazole. The compound (c) may suitably be phthalic anhydride. With hardeners of this type, curing of an epoxy resin composition is possible at temperatures as low as 80° C. but a cure time of at least 30 minutes is required. Such a long cure time is disadvantageous for industrial use.

U.S. Pat. No. 4,546,155 indicates at column 4 lines 55-59 that the latent curing agent of that Patent can be used in combination with a known curing agent such as an acid anhydride, a dicyandiamide, a dibasic acid hydrazide, guanamine, or melamine. However there is no suggestion that any synergistic effect could be obtained.

SUMMARY OF THE INVENTION

It is an object of the present invention to provide an epoxy resin composition containing a latent hardener combination which has good shelf life but which exhibits a surprising effect in achieving cure in a short time at relatively low temperature.

The present invention provides a latent hardener material for epoxy resins comprising a combination of
Hardener (A) which is a reaction product of phthalic anhydride and an aliphatic polyamine, and
Hardener (B) which is a reaction product of (i) a polyfunctional epoxy compound, (ii) a compound having at least one functional OH, $NH_2$, NH or SH group together with a tertiary amino group in the molecule, and (iii) a carboxylic acid anhydride.

The invention also provides curable one-part epoxy resin compositions comprising an epoxy resin in admixture with a combination of compounds (A) and (B) as defined above.

It has surprisingly been found that a combination of latent hardeners (A) and (B) can achieve cure of an epoxy resin composition in 15 minutes at 76° C., while the composition containing the two hardeners has a good shelf life, e.g. of at least 1 month at 45° C. Although this invention is not bound by any theory, it is believed that hardener (A) is activated at a lower temperature than hardener (B) i.e. about 70°-75° C. However with hardener (A) alone the cure is very slow and no satisfactory cure is achieved in a reasonable time unless the temperature is increased to about 100° C. When hardeners (A) and (B) are present in accordance with the invention, it is believed that the activation of hardener (A) at 70°-75° C. energizes hardener (B) and causes it to start up at lower temperature than usual (80° C.) and to cure the composition more rapidly.

Epoxy resin compositions are used industrially in very small portions e.g. for attaching semiconductor chips to printed circuit boards. In such small portions there is little or no exothermic effect on curing. Therefore a reduction in cure time from 30 minutes to 15 minutes and a reduction in cure temperature from 80° C. to 76° C. could be economically very significant in terms of production output and the heat input required.

Hardeners (A) and (B) may suitably be present in a ratio ranging from 12:1 to 3:1. The quantity of total hardeners may suitably vary from 50 to 100 parts per 100 parts of epoxy resin.

Hardener (B) is preferably a reaction product of (i) a polyfunctional epoxy compound, (ii) an imidazole compound, and (iii) phthalic anhydride. The polyfunctional epoxy compound may be any compound having two or more epoxy groups in the molecule as described in U.S. Pat. No. 4,546,155. the contents of which are incorporated by reference. More preferably the imidazole compound is 2-ethyl-4-methylimidazole.

Examples of these hardeners are disclosed in U.S. Pat. No. 4,546,155 especially in Table 1 at column 6 thereof, where sample 13 in particular is an adduct of Epon 828 (Bisphenol Type epoxy resin epoxy equivalent 184-194, a product of Shell Chemical Co.), 2-ethyl-4-methylimidazole and phthalic anhydride. A hardener of this type is commercially available from Ajinomoto Co., Inc. under the Trade Mark AJICURE PN-23.

Hardener (A) is suitably a reaction product of phthalic anhydride and an aliphatic polyamine having at least 3 active hydrogens per molecule, more particularly diethylene triamine, triethylene tetraamine, tetraethylene pentamine or pentaethylene hexamine. Diamines such as ethylene diamine, tetramethylene diamine, or hexamethylene diamine may also be useful.

The hardener (A) most suitably is a reaction product of approximately equimolecular proportions of phthalic anhydride and diethylenetriamine as described in British Patent 1,121,196, the contents of which are incorporated by reference. A hardener of this type is commercially available from Ciba Geigy A.G. under the designation HT-9506.

The epoxy resin compositions may be any of such compositions known in the art and as described for example, in British Patent 1,121,196 and/or U.S. Pat. No. 4,546,155.

DESCRIPTION OF THE PREFERRED EMBODIMENTS

The invention will be further described and illustrated in the following Examples.

EXAMPLES

Formulations were made up using the following hardeners:

Hardener (A): Reaction product of phthalic anhydride and diethylenetriamine commercially available as HT-9506 from Ciba Geigy A.G.

Hardener (B): Reaction product of a polyfunctional epoxy compound, an imidazole compound and a carboxylic acid anhydride commercially available as AJICURE PN-23 from Ajinomoto Co., Inc.

The basic formulation was as follows:

|  | Weight % |
|---|---|
| Quatrex 1010 | 56.14 |
| DER 736 | 13.75 |
| Rocket Red dye | 1.69 |
| Pylam Yellow dye | 0.10 |
| Hardener (A) - HT 9506 | 0 or 60 phr |
| Hardener (B) - PN-23 | 5, 10, 15, or 20 phr. |

Quatrex 1010 is an epoxy resin based on the reaction product of epichlorohydrin and bisphenol A, available from Dow Chemicals. Quatrex is a Trade Mark.

DER 736 is a short chain polyglycol diepoxide available from Dow Chemicals.

Der 736 acts as a reactive diluent for the Quatrex 1010 resin.

phr = parts per hundred parts of the total composition.

The exemplary formulations were numbered as follows:

Formulation 1: 60 phr HT 9506
Formulation 2: 60 phr HT 9506 + 5 phr PN-23
Formulation 3: 60 phr HT 9506 + 10 phr PN-23
Formulation 4: 60 phr HT 9506 + 15 phr PN-23
Formulation 5: 60 phr HT 9506 + 20 phr PN-23
Formulation 6: 5 phr PN-23
Formulation 7: 10 phr PN-23
Formulation 8: 15 phr PN-23
Formulation 9: 20 phr PN-23

CHIP-PUSH-OFF STRENGTH TESTS

Formulations 1-4, with addition of 13 phr 9-65 hydrophobic silica TS-720, were subjected to Chip push-off strength tests by standard procedure which is described as follows:

Appropriate sized drops of adhesive (sufficient for 80% cured coverage of device) are dispensed using a Siemens adhesive dispenser onto a FR 4 epoxy glass reinforced printed wiring board laminate. Surface mount device components are placed manually onto the adhesive drops using a tweezers. The components used are 1206 resistors and capacitors, small outline transistor (SOT) 23's and cylindrical MELF components. A minimum of five of each component are required per test.

Adhesive curing is carried out in a conventional convection oven fitted with a metallic heat sink. A thermocouple with direct temperature readout is affixed to the FR 4 epoxy glass laminate bonding surface in order to monitor the actual temperature of cure accurately. When the laminate attains the desired curing temperature a timing device is started and the curing process allowed to continue for the desired period. The assembly is removed from the oven and allowed to equilibrate to ambient conditions.

Bond strengths are determined by measuring a push off force using a Chatillon gauge fitted with a suitable gripping apendage. The strength measured is expressed as an average plus or minus a standard deviation in kilograms.

In these tests, each of the formulations 1-4 was cured at 75° C. for 15 minutes. The results of the tests are set out in Table 1.

TABLE 1

| | Chip push-off strengths | | | |
|---|---|---|---|---|
| Formulation | Resistor | Capacitor | SOT. 23 | Melf |
| #1 | — | — | — | — |
| #2 | — | — | — | — |
| #3 | 1.3 ± 0.1 | 1.2 ± 0.2 | 2.2 ± 0.1 | 0.8 ± 0.2 |
| #4 | 1.3 ± 0.3 | 2.0 ± 0.3 | 1.8 ± 0.2 | 1.6 ± 0.8 |

Strengths in KGS.

It will be seen that formulation 1 containing 60 phr hardener (A) alone and formulation 2 containing only 5 phr of hardener (B) in combination with 60 phr hardener (A) showed no appreciable bond strengths after cure under these conditions, whereas formulations (3) and (4) containing 10 phr and 15 phr of hardener (B) with 60 phr hardener (A) showed acceptable bond strengths. The measurements were all made at ambient temperature.

LAP SHEAR STRENGTH TESTS

Formulations 1-9 were subjected to Lap Shear Strength Tests using grit blasted mild steel lap shears. Each formulation was applied to one lap shear, a second lap shear was placed in overlapping relationship with it, and the formulation between the two lap shears was cured at 75° C. for 15 minutes. Strengths required to pull the lap shears apart were then measured. The results are shown in Table 2.

TABLE 2

| Lap shear strengths at 75°/15 Minutes | |
|---|---|
| Formulation | Strength |
| #1 | 69.0 ± 8.1 |
| #2 | 73.0 ± 5.0 |
| #3 | 102.3 ± 6.5 |
| #4 | 111.0 ± 5.0 |
| #5 | 106.0 ± 5.7 |
| #6 | No strength |
| #7 | No strength |
| #8 | No strength |
| #9 | No strength — Hand Fixtured |

It will be seen by comparison of formulations 3, 4 and 5 with formulation 1 that addition of 10 phr or 20 phr Hardener (B) to Hardener (A) achieves an approximate 54% increase in lap shear strength. However the results for formulations 7-9 show that no strength is achieved with Hardener (B) at these concentrations. The measurements were all made at ambient temperatures.

DIFFERENTIAL SCANNING CALORIMETRY

Formulations 1-8 were subjected to an isothermal scan at 80° C. The results are shown in Table 3.

TABLE 3

| DSC - Isothermal (80° C.) Information | | |
|---|---|---|
| Formulation | ΔH (J/g) | Peak Time (Minutes) |
| #1 | 73.3 | 3.0 |

TABLE 3-continued

| DSC - Isothermal (80° C.) Information | | |
|---|---|---|
| Formulation | ΔH (J/g) | Peak Time (Minutes) |
| #2 | 90.5 | 11.7 |
| #3 | 1383.8 | 2.7 |
| #4 | 233.4 | 9.6 |
| #6 | | No response |
| #7 | | No response |
| #8 | | No response |

It will be seen that Hardener (A) kicks at lower time than Hardener (B) but the ΔH value of Hardener (A) alone is too low to give any acceptable strength, whereas acceptable ΔH strengths are achieved with combination of Hardeners (A) and (B).

STABILITY

Formulation 1, 3 and 5 were subjected to accelerated elevated stability tests in 5 ml. polypropylene syringes. The results are shown in Table 4.

TABLE 4

| Gel times versus temperature in 5 ml. polypropylene syringes | | | |
|---|---|---|---|
| T(°C.) | #1 | #3 | #5 |
| 55 | 5 | 2 | 0.75 |
| 50 | 6 | 3 | 2 |
| 45 | 408 | 72 | 20 |
| 35 | >408 | >408 | 408 |

Gel times in hours unless otherwise shown.

I claim:

1. A latent hardener material for epoxy resins comprising a combination of:

Hardener (A) which is a reaction product of phthalic anhydride and an aliphatic polyamine, and
   Hardener (B) which is a reaction product of:
   (i) a polyfunctional epoxy compound,
   (ii) a compound having at least one functional OH, $NH_2$, NH or SH group together with a tertiary amino group in the molecule, and
   (iii) a carboxylic acid anhydride.

2. A hardener material according to claim 1 wherein Hardener (A) is a reaction product of phthalic anhydride and an aliphatic amine having at least 3 active hydrogens per molecule.

3. A hardener material according to claim 2 wherein Hardener (A) is selected from diethylene triamine, triethylene tetramine, tetraethylene pentamine or pentaethylene hexamine.

4. A hardener material according to claim 1 wherein Hardener (A) is a reaction product of phthalic anhydride and diethylene triamine.

5. A hardener material according to claim 1 wherein Hardener (B) is a reaction product of
   (i) a polyfunctional epoxy compound
   (ii) an imidazole compound
   (iii) phthalic anhydride.

6. A hardener material according to claim 1 wherein Hardeners (A) and (B) are present in a ratio ranging from 12:1 to 3:1.

7. A curable one-part epoxy resin composition comprising an epoxy resin in admixture with a combination of Hardener (A) and (B) as defined in claim 1.

8. A composition according to claim 7 wherein the quantity of total hardener varies from 50 to 100 parts per 100 parts of epoxy resin.

* * * * *